United States Patent [19]

Gaylord

[11] 4,397,710

[45] Aug. 9, 1983

[54] MACHINE FOR APPLYING INDICIA TO TAPERED OR STRAIGHT CYLINDRICAL ARTICLES

[75] Inventor: Barney G. Gaylord, Naperville, Ill.

[73] Assignee: The Meyercord Co., Carol Stream, Ill.

[21] Appl. No.: 341,860

[22] Filed: Jan. 22, 1982

[51] Int. Cl.$^{3}$ ........................ B32B 31/00; B44C 1/00; B65B 13/34

[52] U.S. Cl. .................................... 156/475; 156/238; 156/249; 156/542; 156/541; 156/DIG. 27; 156/363; 101/33

[58] Field of Search ............... 156/541, 542, 447, 448, 156/449, 458, 481, 475, 482, 361, 363, 566, 238, 240, 249, DIG. 33, DIG. 14, DIG. 27, DIG. 26, DIG. 13, DIG. 39; 101/38 R, 38 A, 39, 33, 40, 34, 177; 100/155 R, 169, 172

[56] References Cited

U.S. PATENT DOCUMENTS

| | | | |
|---|---|---|---|
| 3,398,678 | 8/1968 | Usko | 101/38 R |
| 3,710,712 | 1/1973 | Demierre | 101/39 |
| 3,928,115 | 12/1975 | Kerwin | 156/363 |
| 4,239,570 | 12/1980 | Kerwin | 156/361 |
| 4,336,095 | 6/1982 | Hoffman | 156/542 |
| 4,343,670 | 8/1982 | Brown | 156/238 |

FOREIGN PATENT DOCUMENTS

| | | | |
|---|---|---|---|
| 583064 | 12/1946 | United Kingdom | 156/DIG. 10 |

*Primary Examiner*—Edward C. Kimlin

*Assistant Examiner*—Louis Falasco

*Attorney, Agent, or Firm*—Merriam, Marshall & Bicknell

[57] ABSTRACT

This disclosure relates to a machine for transferring indicia, preferably decals, from a rolled carrier strip or web to a series of articles. The articles may have straight cylindrical sides like that of root beer mugs, they may have positive tapered sides such as tapered water glasses, or they may have negative tapered sides such as the upper part of stemmed wine glasses. A series of the decals are attached to the elongated web and are spaced a generally constant distance apart in the direction of the length of the web. The configuration of the decals corresponds to a flat layout of the outer surface of the articles being decorated. For a straight mug the decal is generally rectangular; for a glass having a positive taper the decal is curved in one direction; and for a glass having a negative taper the decal is curved in the other direction. The machine includes a mandrel that rotatably supports an article and a pressure mechanism for pressing the web and the decal against the article on the mandrel. The pressure mechanism includes a pressure roller and a movable belt between the pressure roller and the mandrel. The roller and the mandrel are mounted on a frame that is movable or may be locked in place. For a straight article the frame is locked, but for a tapered article the frame is movable to follow the arc of the curved decal. The machine further includes a control system for periodically advancing the web as each decal is being applied, and for actuating the pressure means to press the decals onto the articles.

10 Claims, 11 Drawing Figures

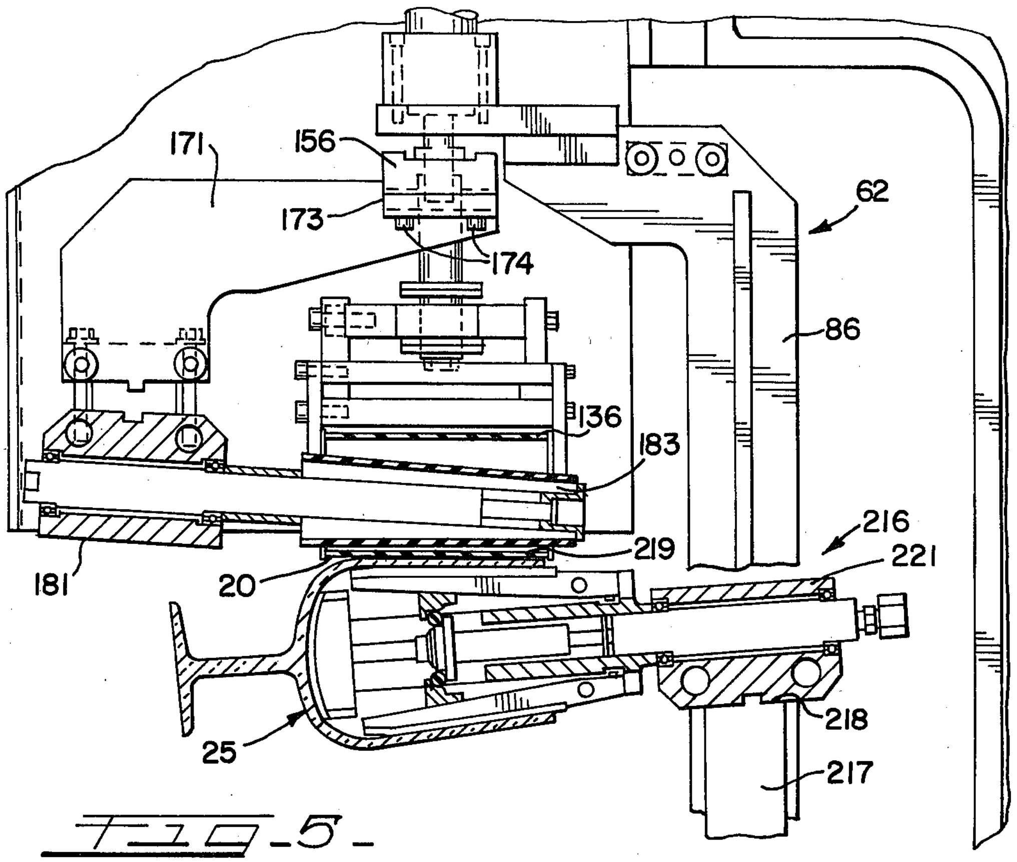
Fig-5-
Fig-4-
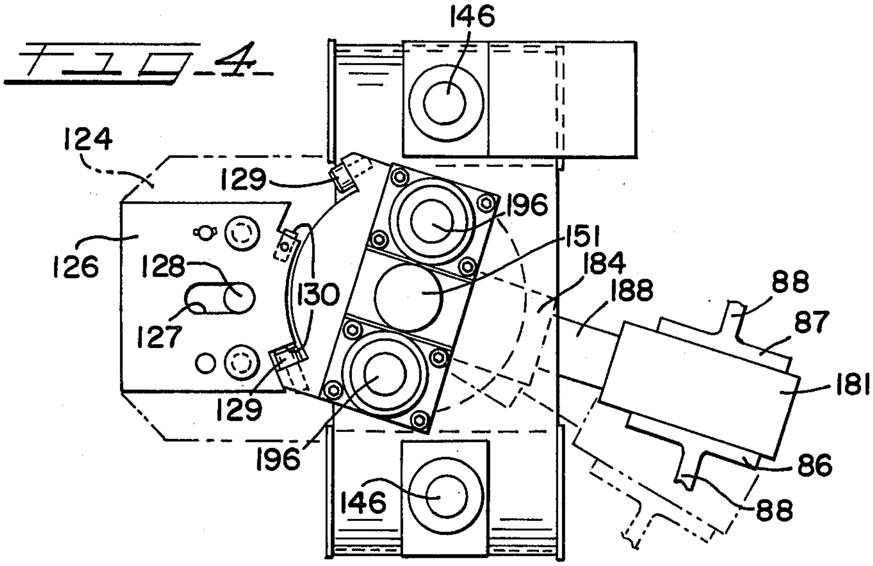

216
221
222
223
224
226
227
228
229
231
232
233
234
236
237
238
239
240
241
242
243
244
246
247
250
251
252
256
257
258
23

MACHINE FOR APPLYING INDICIA TO TAPERED OR STRAIGHT CYLINDRICAL ARTICLES

DISCLOSURE

Kerwin U.S. Pat. No. 3,813,268 discloses a machine for applying indicia, such as decals, to articles having substantially straight cylindrical sides, such as mugs or bottles. The decals are carried by an elongated web or strip of backing material, and the web is passed between an article support and a movable die. The die is curved and it folds the decal across one side of the article when the die and the web are pressed against the article. Brakes and a photocell sensor control the advance of the web through the machine as the decals are applied to successive articles. The article is immovable in the support and consequently the machine can apply a decal to only a limited area on the side of the article facing the die.

Kerwin U.S. patent application Ser. No. 277,858 and U.S. Pat. Nos. 3,928,115 and 4,239,570 disclose machines for folding or wrapping a decal or label substantially entirely around an article. In the machine shown in U.S. Ser. No. 277,858, this is accomplished by providing a rotatable mandrel on which each article in turn is mounted, and by providing a rotatable pressure roller for pressing a web including a decal onto the article. The web is moved substantially linearly while the pressure roller and the article on the mandrel are rotated, thereby wrapping or folding the decal around substantially the entire circumference of the article.

In the machines shown in U.S. Pat. Nos. 3,928,115 and 4,239,570, a cylindrical bottle or a tapered glass are moved in a straight line between two moving belts. At the same time the bottle or glass is rotated to make it roll across a decal on a moving web. In these machines the decals may be wrapped substantially entirely around the article. The machines described in Ser. No. 277,858 and in U.S. Pat. No. 3,928,115 have the disadvantage that they have the capability of decorating only articles having substantially straight cylindrical sides. They cannot decorate an article having a substantially tapered outer surface. The machine shown in U.S. Pat. No. 4,239,570 can apply a decal to an article having a slight taper, but since the articles and the decals are moved in straight lines, the decals must be specially formed to correct for the distortion that occurs during the transfer.

It is a general object of this invention to provide a novel and improved machine that has the capability of wrapping decals around articles having either straight or tapered sides and which does not require pre-distorted decals.

A machine in accordance with the invention transfers a series of indicia from a relatively long web to a series of articles, the indicia being spaced on said web. The machine comprises a support frame, a movable frame connected to said support frame for pivotal and linear movements relative to said support frame, a mandrel fastened to said movable frame for rotatably supporting an article that is generally circular in cross-section, pressure means including a pressure roller which is rotatably mounted on said movable frame, said mandrel and said pressure roller having adjacent sides which are substantially parallel, web transport means for holding a web between said mandrel and said pressure roller, in a plane that is substantially parallel to said adjacent sides, power means for moving said pressure roller and said mandrel towards each other to press the web including an indicium tightly against an article on said mandrel, said web transport means including web drive means for moving the web past said mandrel and said pressure means, said mandrel and said pressure roller rotating with said web movement.

Various objects, features and advantages of the present invention will be apparent from the following detailed description taken in conjunction with the accompanying figures of the drawings which, by way of a preferred example only, illustrate an embodiment of the invention, wherein FIG. 1 is a front view of a machine embodying the present invention;

FIG. 4 is a fragmentary enlarged view showing parts of a pivot mechanism of the machine;

FIG. 5 is a view generally similar to FIG. 3 but showing a modified arrangement of the machine;

While the following detailed description includes references to the locations of parts relative to other parts in a figure of the drawings, such as above or below, it will be understood that such references are used herein only to facilitate the description of the parts, since the apparatus described may have various orientations before and during use. Although the description and the attached claims describe the transfer of decals to articles, the machine may also be used to transfer other indicia such as labels to articles.

Figure 1:
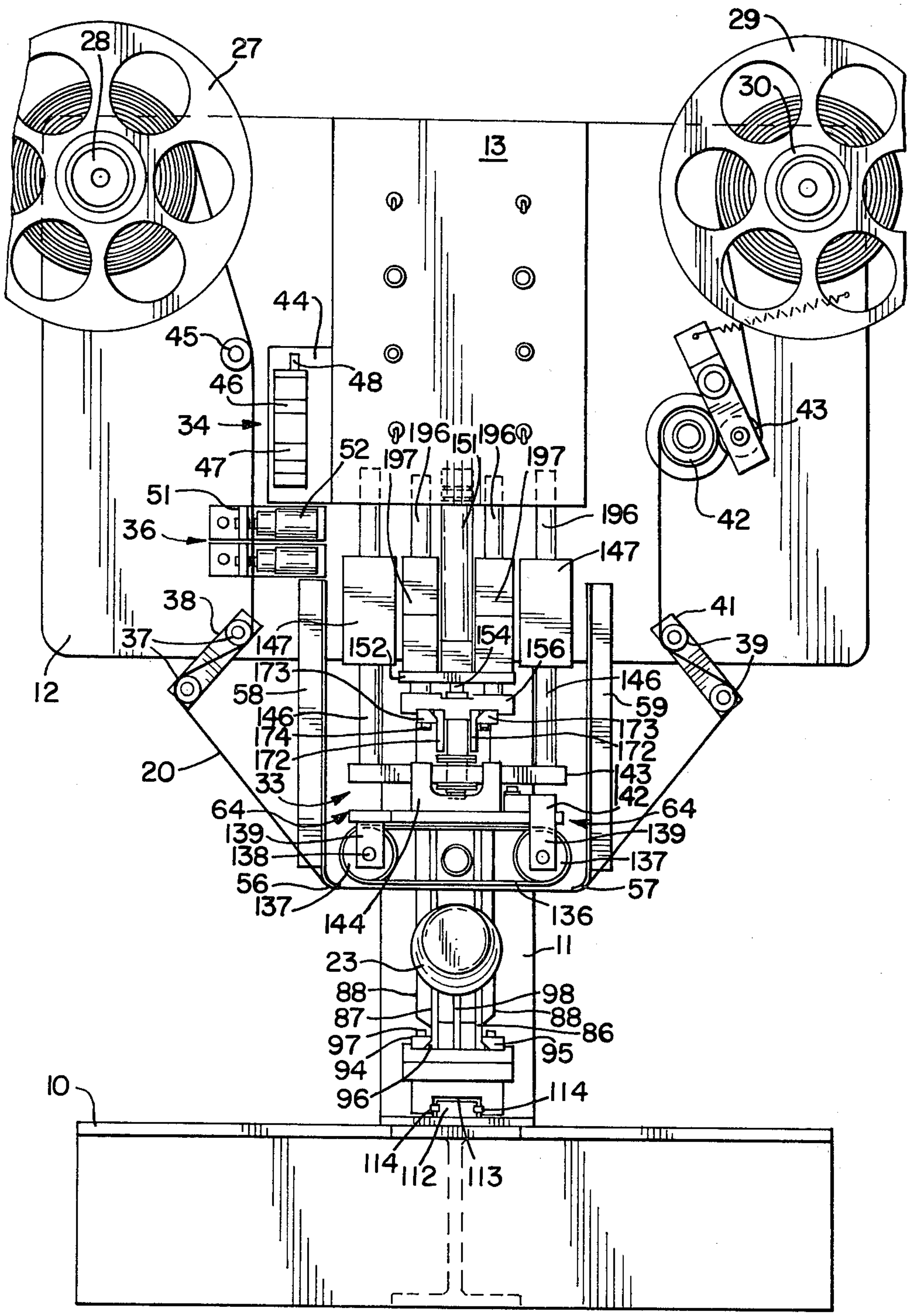
Figure 2:
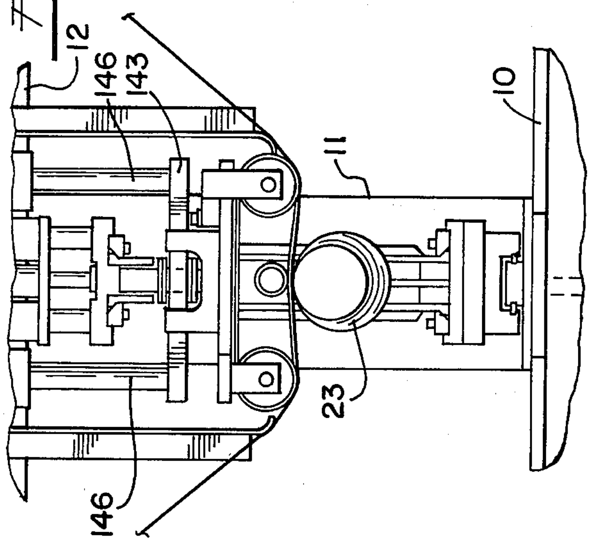
FIG. 2 is a fragmentary view similar to FIG. 1 but showing another position of some of the parts.
Figure 3:
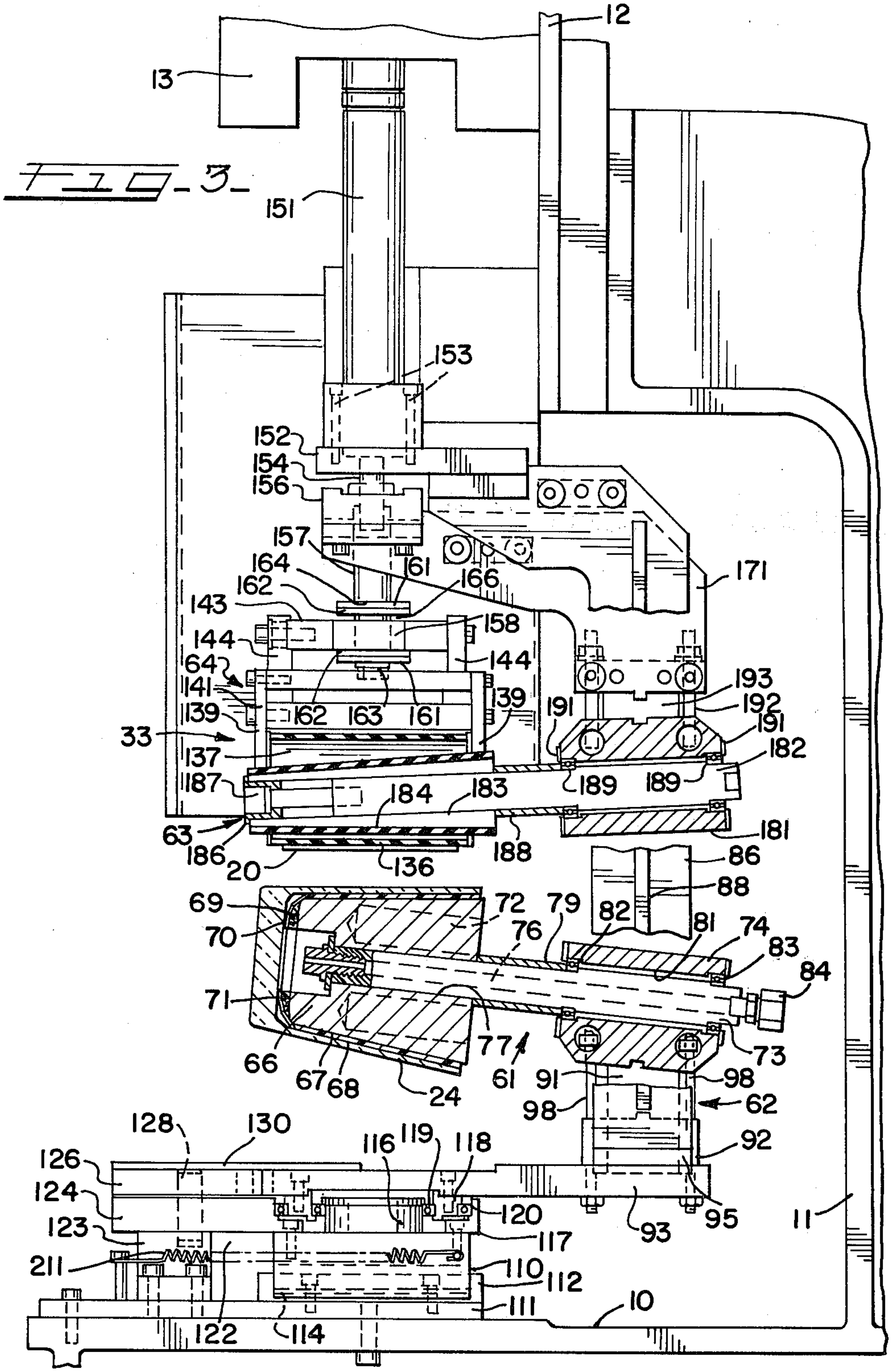
FIG. 3 is a fragmentary side view of the machine with some parts in section.

With reference to FIGS. 1, 2 and 3 of the drawings, the apparatus includes a base 10 that has fastened to its rear side a vertically extending support post 11. At the upper end of the support post 11 is fastened a generally rectangular mounting plate 12 which supports most of the operating mechanisms and the control circuitry of the machine. A control box and panel 13 are mounted at approximately the center section of the mounting plate 12 and houses some of the controls.

As mentioned, the apparatus is particularly designed to transfer decals from an elongated backing sheet or web to a series of articles. With reference to FIGS. 1, 2, 8 and 9, the elongated web is indicated by the reference numeral 20 and a series of decals 21 are formed on the web at generally regularly spaced intervals. The decals are formed on one side of the web 20 and may be conventional heat-release decals. A series of marks 22 are formed on either the frontside or the backside of the web, one mark being associated with each decal. In the present example, the marks 22 are formed on the backside.

As mentioned, the machine transfers the decals from the web to a series of articles. In the specific example illustrated in FIGS. 1–3 and 9, the article consists of a glass 23 having a positive taper on its outer wall 24. The length of each decal 21 is no greater than the circumference of the outer wall 24, and as will be described, the decal is rolled or wrapped onto the wall 24. In the example shown in FIGS. 5, 6 and 7, the article consists of a stemmed wine glass 25, the upper portion of which has a negative taper.

After manufacture of the web 20 and the decals 21 thereon, the web is wound on a feed or supply reel 27 (FIG. 1), or another type of supply system may be used. A web transport mechanism moves the web 20 through the machine and includes a supply spindle 28 that supports the reel 27. The supply spindle 28 is located in the upper left-hand corner of the plate 12 as seen in FIG. 1. From the supply reel 27 the web 20 extends along a web transport path to a take-up or rewind reel 29 that is rotatably mounted on a take-up spindle 30. The spindle 30 is mounted in the upper right-hand corner as seen in FIG. 1 of the plate 12 and a motor, not shown, is connected to turn the take-up spindle 30 in order to wind the web 20 onto the take-up reel 29.

The web transport mechanism carries or conducts the web 20 between an article 23 and a pressure assembly 33 to be described hereafter.

Figure 8:
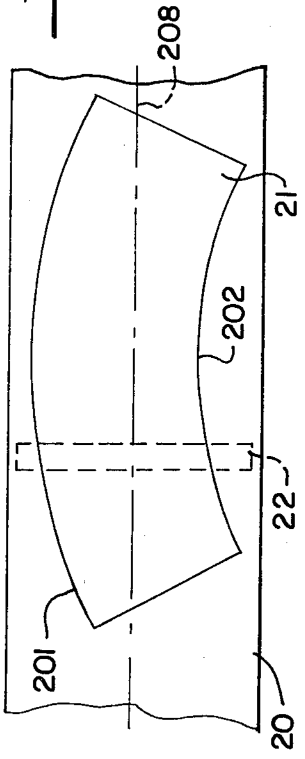
FIG. 8 is an illustration of a web including a decal for use with the machine; and FIGS. **9*a* to 9*c*** are drawings illustrating the operation of the machine.

The web 20 is further moved past a sensor assembly 34 which responds to the dark sensor marks 22 shown in FIGS. 8 and 9, past a web brake assembly 36, past a first pair of idler rollers 37 that are mounted on an arm 38, past the pressure means 33, past a second pair of idler rollers 39 that are mounted on a second arm 41, past a drive roller 42 and pressure roller 43, and to the take-up reel 29.

The sensor assembly 34 comprises a bracket 44 that is fastened to the mounting plate 12. Mounted on the bracket 44 are an upper photocell 46 and a lower photocell 47 which are vertically spaced and respond to the presence of a mark 22. It is preferred that at least one of the two photocells be vertically adjustable, and in the present example a screw 48 is provided to move the upper photocell 46.

Both the upper photocell 46 and the lower photocell include a sensor and a light source. As shown in FIG. 1, the web 20 is held closely adjacent the sensor assembly 34 by an idler roller 45, and the side of the web 20 which faces the sensor assembly 34 contains the sensor marks 22. The light source of the upper photocell 46, for example, directs light toward the web 20 and in the absence of a sensor mark 22, some of the light is reflected toward and received by the upper sensor. However, when a sensor mark 22 crosses the light path, the light is absorbed and not reflected, and the absence of reflected light caused by the presence of the sensor mark is detected by the sensor. The sensor assembly 34 is located, relative to the decals 21 and to the marks 22 so that the forward edge of a decal 21 is adjacent the glass 23 when a mark 22 is adjacent the lower cell 47 and when the pressure assembly 33 and the web 20 are moved downwardly as shown in FIG. 2. The upper cell 46 is located so that the trailing edge of the decal is adjacent the glass when a mark is sensed by it and the pressure assembly is down.

Since a mark 22 is associated with each decal 21 and since the sensors could be arranged to respond to the decals instead of the marks, the sensors may be considered to sense or respond to the decals.

The brake assembly 36 may be the same as the brake 43 shown in U.S. Pat. No. 3,813,268, except that two brakes are provided rather than one in order to obtain greater holding power. Each brake includes a stop 51 on one side of the web 20 and a solenoid valve controlled air cylinder 52 on the other side. The cylinder 52, when energized, moves its plunger toward the left as seen in FIG. 1 and clamps the web 20 tightly between the plunger and the stop 51, thereby preventing movement of the web 20. When the air cylinder 52 is not energized, the plunger is moved toward the right away from the web 20 and the web is released.

The idler rollers mounted on the arm 38 and the idler rollers mounted on the arm 41 are generally similar to the corresponding rollers and arms illustrated and described in the previously mentioned Kerwin U.S. Pat. No. 3,813,268. In the machine shown in the patent, the arms pivot during operation, but in the present machine the arms are preferably locked in place.

The web transport path is further formed by a pair of guards or guides 56 and 57 which are laterally spaced on opposite sides of the pressure assembly 33. The two guides 56 and 57 are curved at their lower ends toward each other and in the direction of the pressure assembly and the two guides are formed at the lower ends of two plates 58 and 59 which in turn are secured to the mounting plate 12. The two guides 56 and 57 are spaced sufficiently far apart that the pressure assembly 33 may be moved downwardly between them as shown in FIG. 2.

The construction of the drive roller 42 may be the same as the corresponding drive roller 31 illustrated and described in the above-mentioned Kerwin patent, and the mounting and operation of the pressure roller 43 may be the same as the pressure roller 32 described in the patent. The take-up spindle 30 has torque applied thereto by a motor (not shown) which tends to turn the take-up reel 29 during operation of the machine, and this construction may also be similar to the corresponding parts shown in the Kerwin patent.

The mechanism for transferring the decals 21 from the web 20 to a series of glasses 23 includes a mandrel 61 that is mounted on a movable column 62. The mechanism further includes the pressure assembly 33 which comprises a pressure roller 63 and a belt subassembly 64. The column 62 is mounted, as will be described hereinafter, for movement in a pivotal direction and in a linear direction, and the column carries the mandrel 61 and the pressure roller 63 with it in this movement. The belt subassembly 64 is mounted on the mounting plate 12 for vertical movement.

The mandrel 61 in the embodiment of the invention shown in FIGS. 1–3 is designed to support a glass 23 wherein the outer surface of the side wall 24 has a positive taper, as previously mentioned and as best shown in FIG. 3. In the embodiment of the invention shown in FIGS. 5 through 7, an alternative construction of the mandrel is shown which is designed to support a glass 23 having a negative outer taper. The mandrel 61, shown in FIG. 3, includes a support block 66 having a taper on its outer surface 67 which is substantially the same as the taper of the inner surface of the glass 23. A thin layer of resilient material 68 is fastened to the tapered outer wall 67 of the block 66. To form a seal between the forward end of the block 66 and the glass 23, two layers 69 and 70 of different resilient materials are fastened to the forward end surface 71 of the block 66. The inner layer 69 is a relatively thick pad of a soft and springy material such as an open cell foam elastomer. The outer layer 70 is relatively thin, flexible material having good tensile strength, such as a medium durometer solid elastomer. Preferably, both elastomers are silicone rubbers which will withstand the high temperatures of the heated glasses 23. The two layers 69 and 70 are adhesively bonded together and to the block 66. The smooth outer skin formed by the layer 70 produces a good vacuum seal against the bottom of the glass, while the soft inner layer 69 allows the layer 70 to conform to irregular glass surfaces. The outer edges of the outer layer 70 are securely bonded to the block 66, and its tensile strength is high enough to to hold the soft inner layer 69 in place when a relatively high vacuum is formed within the glass. If desired, holes 72 may be formed in the block 66 in order to reduce its mass.

When the term "forward" is used herein, it is meant toward the left as seen in FIG. 3 because this is the front of the machine where an operator stands. "Rearward", of course, means toward the right.

The support block 66 is secured to a shaft 73 which, in turn, is rotatably mounted on a bearing block 74. The shaft 73 has a hole 76 formed along its axis, and the forward end of the hole is threaded. The support block 66 has an axially extending hole 77 formed in it and the shaft 73 is positioned through the hole. A fastening bolt 78, which has a hole formed through it, is positioned at the forward side of the block 66 and threaded into the forward end of the hole 76, and a tubular spacer 79 is positioned positioned around the shaft 73 adjacent the rearward side of the block 66. The bearing block 74 has a central opening 81 formed in it which receives two ball bearings 82 and 83, the bearings in turn supporting the shaft 73. At the rearward end of the shaft 73, a tubular nipple 84 is connected to the hole 76 so that a vacuum hose (not shown in FIG. 3) may be connected to the hole 83. The forward end of the hole 76 communicates with the forward end of the block 66 within the O-ring 69, so that a partial vacuum may be produced within the hole 76 and within the area of the seal 70 in order to hold the glass 23 on the mandrel.

The column 62 comprises two laterally spaced members 86 and 87 (FIGS. 1 and 3). Each of the members 86 and 87 has a laterally extending flange or fin 88 formed thereon in order to strengthen it. Between the two members 86 and 87 is a lower spacer 91 that extends from the underside of the bearing block 74 to a lower block 92 that forms part of the column 62. With reference to FIGS. 1 and 3, the lower ends of the two members 86 and 87 are fastened to the upper side of a turntable 93 by two bar clamps 94 and 95. As shown in FIG. 1, the blocks 94 and 95 extend over flanges 96 formed at the lower ends of the members 86 and 87 and screws 97 extend through the clamps 94 and 95 and are threaded into the table 93 in order to tightly secure the column to the table 93. The lower block 92, of course, holds the two members 86 and 87 in spaced relation at their lower ends. The bearing block 74 is secured in place by a pair of tie rods and nuts 98 which are connected between the bearing block 74 and the spacer 91.

The turntable 93 that supports the lower end of the column 62 is in turn supported on the base 10 by a linear slide 110 and a track plate 111. The track plate is secured to the upper side of the base 10 and includes a track 112 (FIGS. 1 and 3) that is elongated in the forward-rearward direction. The slide 110 has a recess 113 that receives the track 112, and a linear bearing 114 on each side of the track 112 supports the slide 110 for sliding movement in the forward-rearward direction. On the upper side of the slide 110 is a pivot post 116 (FIG. 3) and an annular bearing support 117 that is spaced from and concentric with the post 116.

On the underside of the turntable 93 is an annular outer bearing support 118 that is positioned in the space between the post 116 and the support 117. Concentric inner and outer ball bearings 119 and 120 connect the annular support 118 with the post 116 and with the outer bearing support 117, so that the table 93 may pivot freely on the post 116. The ball bearings 119 and 120 are thrust supporting types so that the table 93 cannot tilt on the post 116.

The forward end portion 122 of the slide 110 is U-shaped, the opening of the U extending to its forward end, and a post 123 (FIG. 3), which is in the shape of an inverted T is positioned in the opening between the arms of the U, and the post 123 is bolted to the upper surface of the track plate 111. The annular bearing support 117 is formed at the rearward end of a plate 124 that is secured to the slide 110. An index plate 126 (FIGS. 3 and 4) is fastened to the upper side of the forward end of the plate 124, and the plates 124 and 126 have a slot 127 formed therein that is elongated in the forward-rearward direction. A cylindrical pin 128 is secured to the upper side of the post 123, and the pin 128 extends upwardly between the arms of the U of the slide 110 and into the slot 127. The index plate 126 is thus movable with the slide 110 in the forward-rearward direction on the bearings 114, and this is the linear movement mentioned above. The amount of this linear movement is limited by the length of the slot 127 and the thickness of the pin 128. However, the index plate 126 does not pivot with the turntable 93, and adjustable stops connect the plates 126 and 93. These stops include screws 129 fastened to the pivot plate 93 (see FIG. 4) which are adapted to engage adjustable stop surfaces 130 on the index plate for limiting the amount of pivotal movement in both directions about the axis of the post 116. The stop surfaces 130 are adjustable screws which allow an adjustment of the pivotal movement. The described pivoting movement of the table 93 is also the pivoting movement previously described in connection with the mandrel 16 and the pressure roller 63.

A thin guard plate 130 (FIG. 3) is preferably mounted over the index plate 126 and its juncture with the table 93.

A different index plate 126 would normally be required for each type of glass or angle of taper. The different tapers require different locations of the stops 129 and 130, and the different glass and decal heights require different lengths of the slot 127. One end of the slot 127, of course, determines the starting point of the linear movement in each cycle.

The belt assembly 63 includes an endless belt 136 (FIGS. 1-3) that is looped around two laterally spaced rollers 137. As shown in FIG. 1, the axes 138 of rotation of the two rollers are perpendicular to the direction of movement of the web 20, and the lower run or section of the belt 136 extends parallel to the length of web that is between the belt and the mandrel 61. The two rollers 137 are rotatably supported by brackets 139 that are fastened to a horizontal belt plate 141. The belt assembly may also include an arrangement 142 (FIG. 1) for adjusting the tension in the belt 136.

The belt plate 141 is connected to an upper or pressure plate 143 by a pair of brackets 144. The plate 143 extends laterally of the machine, and a pair of vertically extending guide rods 146 (FIGS. 1 and 2) are secured to and extend upwardly from the end portions of the plate 143. The two rods 146 are slidably supported on the front face of the plate 12 by two slide blocks 147, with the result that the plate 143 and the belt 136 can move upwardly and downwardly but cannot move pivotably or linearly.

To move the belt assembly 64 up and down, an air cylinder 151 (FIGS. 1 and 3) is secured to the upper surface of a top plate 152 by bolts 153. The piston rod 154 of the air cylinder extends downwardly through a hole in the plate 152 and is secured to a coupling 156 that is directly below the air cylinder. An extension 157 of the rod 154 extends through a slot 158 (FIG. 3) formed in the pressure plate 143, the slot 158 being elongated in the forward-rearward direction. On opposite sides of the plate 143 are lower and upper washers 161 and bearings 162, the washers being held between a nut 163 and a shoulder 164 on the extension 157. It should be noted that, in the position of the parts shown in FIG. 3, a gap or space 166 is present between the plate 143 and the upper bearing 162, for a purpose to be described later.

The coupling 156 is also secured to an arm 171 (FIG. 3) that supports the pressure roller 63. From the coupling 156, the arm 171 extends rearwardly and into the space between the two members 86 and 87 of the column 62. With reference to FIG. 1, the arm 171 includes two laterally spaced members 172 that are secured to the underside of the coupling 156 by two bar clamps 173 and screws 174.

The pressure roller 63 is supported by a bearing block 181 that is secured to the rearward and lower end of the arm 71. The pressure roller 63 comprises a support shaft 182 that has a sleeve 183 fastened to it adjacent to its forward end. As shown in FIG. 3, the outer surface of the sleeve 183 is tapered, and a resilient cover 184 is secured to the outer surface of the sleeve. A retaining washer 186 and a bolt 187 fastened to the forward end of the shaft 182 prevent the sleeve 183 from moving off the forward end. A tubular spacer 188 is positioned around the shaft 182 between the sleeve 183 and the bearing block 181, and two roller bearings 189 rotatably connect the shaft 182 with the bearing block 181. Retainer washers 191 on each side of the bearing block 181 hold the assembly of the bearing block 181, the shaft 182 and the roller bearings 189 in tightly assembled relationship.

The bearing block 181 is fastened to the arm 171 by bolts 192 and a spacer 193, similar to the arrangement for fastening the bearing block 74 to the column 62. The lower side of the spacer 193 is slanted as shown in FIG. 3 in order to tilt the shaft 182 forwardly and downwardly slightly.

With reference to FIG. 1, the coupling 156 is also connected to the top plate 152 by two laterally spaced guide rods 196. The vertically extending guide rods 196 have their lower ends secured to the coupling 156 and they extend upwardly through holes formed in the top plate 152. A guide block 197 is fastened to the upper side of the top plate 152 for each shaft 196, with the result that the coupling 156 is able to move downwardly and upwardly relative to the top plate 152. However, the coupling 156 and the guide rods 196 pivot along with the column 62 because of the sliding connection between the guide rods 196 and the guides 197.

The axis of the extension 157 and the piston rod 154 is aligned with the axis of pivotal movement of the turntable 93 on the post 116. This pivotal axis extends approximately through the center of the glass 23, the center of the pressure roller 63 and the centerlines of the belt 136 and the web 20, so that the center of pressure on the glass is essentially on the axis of pivotal movement.

As previously mentioned, the machine shown in FIGS. 1 to 4 and the decals shown in FIGS. 8 and 9 are designed for use with glasses 23 having a positive taper as shown in FIG. 3. The decal 21 for such a glass 23 has an arcuate shape, as shown, so that, when it is applied to the outer surface of the tapered glass wall 24, the upper and lower edges 201 and 202 of the decal will be evenly spaced from the upper and lower edges around the circumference of the side wall 24. The web 20 normally has a series of equally spaced decals 21 along its length. The decals 21 are formed on one side of the web and the mark 22 are formed on the other side, one mark 22 being behind or adjacent each decal.

Figure 9A:
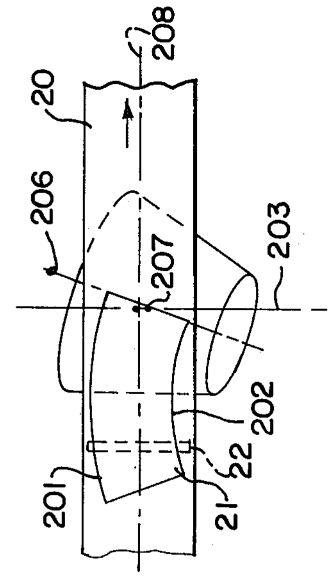

When the machine is in the rest position shown in FIGS. 1 and 3, the brakes 36 are engaged and the web 20 is held by the brakes against movement even though the drive 42 is operative. The sensor assembly 34, operating through the control circuit as described in application Ser. No. 277,858, actuates the brake 36 to hold the web 20 with a decal 21 just past, or to the right of, the uppermost side of the glass 21 on the mandrel 61. When the belt 136 is moved downwardly, the part of the web that is adjacent the glass is drawn back or to the left because the brakes are still engaged. When the web is pressed by the belt against the glass, the leading edge of the decal lies directly on the center line of the glass as shown in FIG. **9*a*. The vertical line 203 in FIG. 9*a* represents the vertical center plane of the machine, and it intersects the axis of the pivot post 116 and the axes of the piston rod 154 and the extension 152**.

To transfer a decal to a glass, an operator places a glass on the mandrel 61 and the partial vacuum holds the glass as shown in FIG. 3. The upper surface of the lower spacer 91 is slanted in order to tilt the glass 23 so that its uppermost surface portion is substantially parallel to the lower run of the belt 136 and to the web. In the rest or neutral position of the machine shown in FIGS. 1 and 3, the belt 136 is spaced upwardly from the glass 23, and the web 20 is stretched tightly across the underside of the belt with the decals attached to the bottom of the web 20 and facing upwardly. The operator positions the mandrel 61 so that it is at its farthest extent forwardly and is angled as shown in FIG. **9*a*** where the uppermost side of the glass is parallel to the leading edge of the decal.

A cycle of operation is initiated when the operator triggers the control circuit as by closing a switch. First, a time delay is initiated and during this delay the vacuum in the mandrel is established to hold the glass. At the end of the delay the air cylinder 151 is energized and the piston rod 154 and the extension 152 are forced downwardly. Since the coupling 156 is directly connected to the rod 154, the arm 171 and the pressure roller 63 are moved downwardly. The belt assembly 64, which is suspended from the lower end of the extension 152, also moves downwardly, and the lower run of the belt and the web engage the upper portion of the glass. At first the belt merely rests on the glass but as the rod 154 moves down, the gap or space 166 closes, and the washer 164 and the bearing 162 then press downwardly on the plate 143 and press the web 20 tightly against the glass. The bottom side of the pressure roller 63 is also pressed tightly against the upper side of the lower run of the belt 136. Both the mandrel 61 and the pressure roller 63 extend at the same angle, shown in FIGS. **9*a* to 9*c*, relative to the plane 203 because they are connected to the column 62. The pressure roller is directly over the mandrel, and the web is tightly pinched or is in a nip between the glass 23 and the belt 136**.

At the time the belt assembly starts to move down, a second time delay is initiated to allow the belt to engage the glass. When the second time delay ends, the control circuit releases the brake assembly 36 while holding the pressure in the pneumatic cylinder 151. The web drive 42 then pulls the web 20 through the machine, causing the glass 23 and the mandrel 61 to rotate due to the frictional engagement between the web and the glass. The belt 136 and the pressure roller cover 184 have relatively high coefficients of friction, and the engagement between the belt and the back side of the moving web causes the belt to move. The pressure roller 63 is caused to rotate because of the engagement between it and the lower run of the belt. The cover 184 and the belt 136 are somewhat resilient with the result that they flatten slightly at the line of engagement, thereby increasing the area of engagement and the frictional force. When the indicia are heat release decals, the bottom or decal side of the web is slippery in the area of the decal because of the wax coating on the web. The glass is caused to turn both by its engagement with the web and with the belt 136 outside of the edges of the web. The backside of the web is normally plain paper and consequently there is good frictional engagement between the web and belt and between the belt and the pressure roller which is sufficient to move the entire assembly of the pressure roller, the mandrel and the column 62 in the pivotal and linear movements. In the event this frictional engagement is not sufficient or if the web tends to tear because of the pull exerted on it, a motor drive may be provided to turn the pressure roller or both the pressure roller and the mandrel. These parts would, of course, have to be turned at surface speeds equal to that of the web.

A tapered object such as the glass 23 and the pressure roller 63 will roll in an arc across a flat surface such as the web 20 and the lower run of the belt 136. The taper of the pressure roller 63 is sized relative to the taper of the outer surface of the glass 23 so that they would roll on arcs having the same radius. In other words, if the belt 136 and the web 20 were not present and the pressure roller were to bear directly on the surface of the glass, the apexes of the two tapers would be coincident. In the position of the parts shown in FIG. 3, the apex of the taper of the pressure roller is spaced directly vertically above the apex of the glass, and the space is equal to the distance between the adjacent surfaces of the glass and the pressure roller. The movement of the belt causes the pressure roller to roll in an arc, relative to the moving web, across the upper surface of the lower run of the belt, and the moving pressure roller carries with it the column 62 and the mandrel 61. The glass 23 also rolls in an arc relative to the underside of the web 20, and since the two arcs have the same radius, the pressure roller will remain directly above the glass and the nip will be maintained.

The pressure roller 63 and the glass 23 do not actually roll in arcs relative to the remainder of the machine; they simulate this movement relative to the remainder of the machine but they do roll in arcs relative to the moving web as previously mentioned. With reference to FIGS. *9a* to *9c*, the web 20 moves toward the right relative to the center plane 203 and the glass 23. The dashed line 206 represents the axis of the glass and the dot 207 represents the mid-point on the height of the glass. The line 208 represents the center line of the web 20.

Figure 9B:
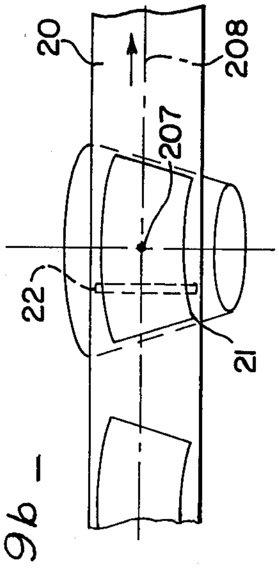
Figure 9C:
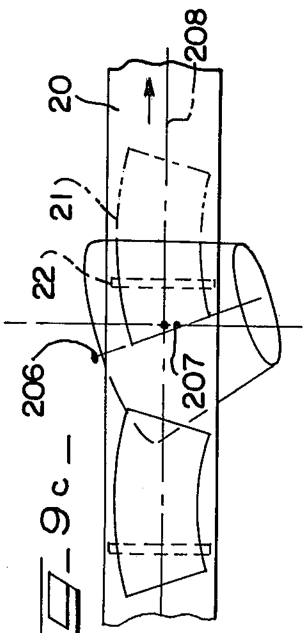

Initially the mid-point of the glass 23 is displaced forwardly of the line 208 (FIG. 9*a*) and the glass is angled toward the right. The arcuate rolling movement of the glass as the web moves toward the right to the FIG. 9*b* position causes the point 207 to move, in the previously mentioned linear movement, toward the rear of the machine, and the angle of the line 206 also shifts as the mandrel pivots. FIG. 9*b* shows the point 207 moving rearwardly to the centerline 208 of the web, but in practice the point 207 may move upwardly, as seen in FIG. 9*b*, to a level above the line 208, depending upon the layout of the decal and the glass support fixtures. The glass, in effect, rolls across the decal 21 and the pressure at the nip causes the decal to be transferred to the glass. The decal is thus wrapped or folded around the glass. As the glass continues its rolling movement past the center point (FIG. 9*b*) to the end point (FIG. 9*c*), the glass angles in the outer direction and the point 207 moves forwardly from the line 208 as the trailing edge of the decal moves to the nip.

At this time the dark mark 22 that was next adjacent the sensor assembly 34 in the upstream direction has moved downwardly to the upper sensor 46 of the sensor assembly, causing actuation of the control circuit to energize the brake 36 and stop the web with the trailing edge of the decal on the centerline of the glass. The air cylinder 151 is actuated to raise the pressure assembly upwardly from the glass (which causes the web to shift toward the right), and the operator removes the glass from the mandrel and installs another glass. Also, as soon as the pressure assembly reaches the upper position shown in FIG. 1, the control circuit releases the brake 36 and the web moves forwardly until the dark mark 22 that was at the upper sensor has moved downwardly to the lower sensor 47. The brake is then engaged again, and the next decal is in position to be applied to the next glass. The operator also manually pivots the mandrel and the column 62 to the starting position. A tension spring 211 (FIG. 3) may be connected between the plate 111 and the plate 110 to move the plate 93, the column, etc. forwardly to the starting position, but this spring is used only when applying decals to articles having a positive taper.

Figures 6, 7:
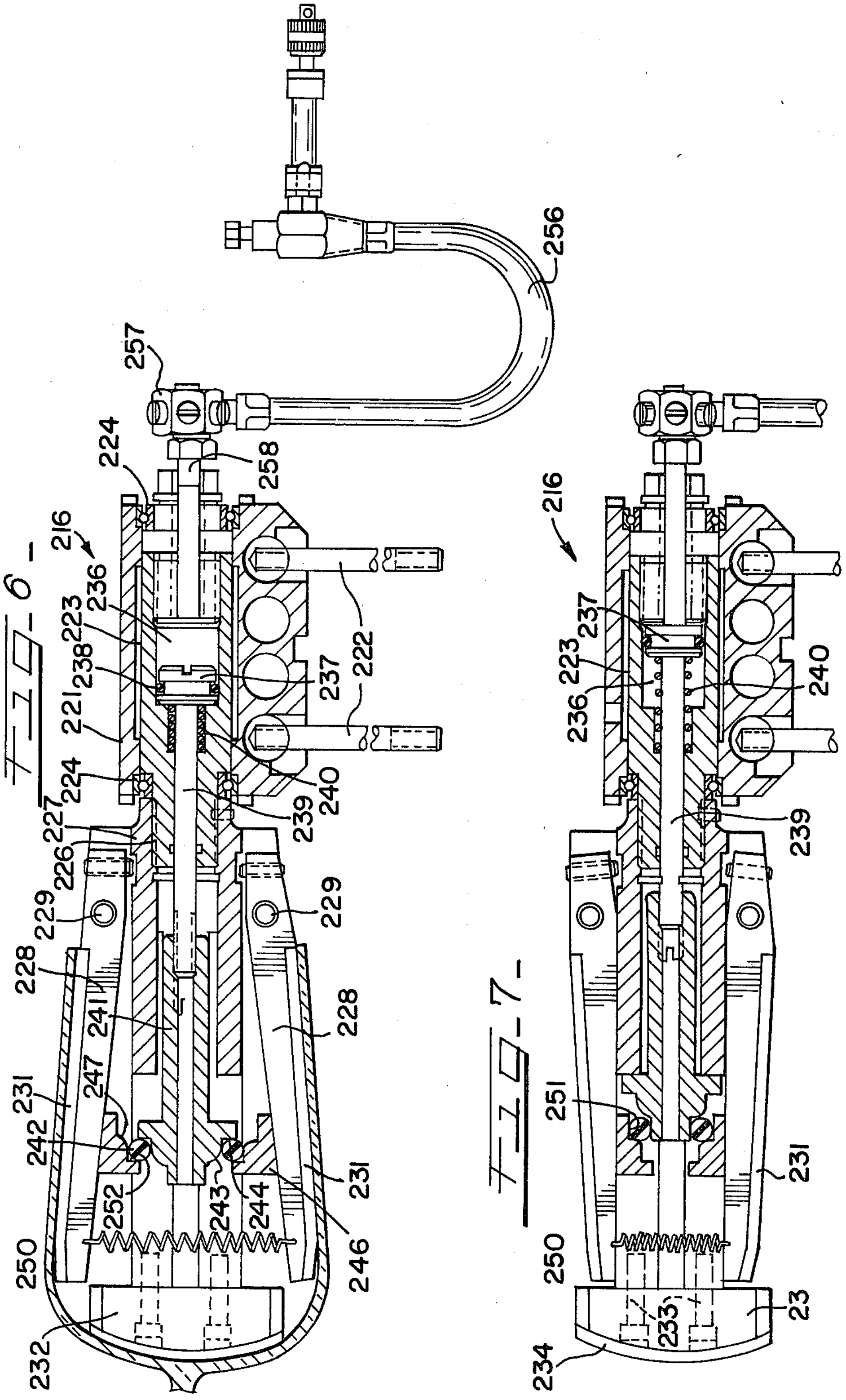
FIGS. 6 and 7 are further enlarged views of a mandrel of the arrangement shown in FIG. 5.

As previously mentioned, the foregoing described structure is designed to transfer a decal from the web 20 to a glass having a positive taper. The structure shown in FIGS. 5 through 7 is designed to transfer a decal from the web to a glass 25, such as a stemmed wine glass, having a negative taper on the outer wall of its upper portion. With reference first to FIG. 5, the arm 171 that supports the pressure roller 63 has its position reversed from the position shown in FIG. 3. This is accomplished by loosening screws 174 that fasten the arm 171 to the coupling 156. When the screws 174 and the shoes 173 are loosened, the arm 171 is withdrawn from the position shown in FIG. 3 and remounted in the position shown in FIG. 5. It may be necessary to dismantle the belt subassembly 33 to accomplish this. The pressure roller, of course, extends between the runs of the belt 136 in both positions. The shape of the sleeve 183 of the pressure roller and the shape and size of the upper spacer 193, of course, depends upon the angle of taper of the glass 25. The mandrel 216 that supports the glass 25 is again mounted between the two members 86 and 87 of the column 62, but the lower spacer 217 has a downwardly and forwardly sloping upper surface 218 so that the mandrel slants downwardly and forwardly from the column 62 in order to place the upper wall portion 219 of the glass 25 in a horizontal position which is parallel to the web 20 and to the lower run of the belt. The height and shape of the lower spacer 217, of course, depends upon the configuration of the glass 25.

The construction of the mandrel 216 for supporting a glass having a negative taper on its inner wall is better shown in FIGS. 6 and 7. The mandrel 216 comprises a bearing block 221 that is positioned on the upper surface of the lower spacer 217 and secured to it by bolts 222. The bearing block 221 rotatably supports a cylinder member 223, a pair of ball bearings 224 being provided to couple the cylinder member 223 to the bearing block 221. Fastened to the forward end of the cylinder member 223 by screw threads 226 is a finger support 227 which pivotably supports a plurality of elongated fingers 228. Each finger 228 is pivotally connected to the support 227 by a pin 229, and each finger has a layer of resilient material 231 secured to its outer surface. The fingers 228 are, of course, angularly spaced around the circumference of the support 227. At the forward end of the mandrel is provided a nose-piece 232 that is connected to the forward end of the support 227 by screws 233. Again, a layer of resilient material 234 is fastened to the outer surface of the nose-piece 232.

The cylinder member 223 has a cylindrical chamber 236 formed in it and a piston 237 is movable in the axial direction in the chamber 236. The piston 237 includes an O-ring 238 for making a sealed connection with the wall of the chamber 236, and a piston rod 239 is connected to and extends forwardly from the piston 237. A compression spring 240 around the rod 239 urges the piston 237 and the rod 239 toward the right. An actuator 241 is secured to the forward end of the piston rod 239 and extends between the fingers 228. An expandable member is fastened to the forward ends of the actuator 241, which may be rollers that are positioned around the forward end of the actuator 241, and the forward surface 243 is curved and forms a cam. The rollers 242 move around the curved surface 243. A radially extending step 244 is formed at the outer end of the curved surface 243 in order to limit the extent of radially outward movement of the rollers 242. Fastened to the inner surface of each finger 228 adjacent the cam surface 243 is another member 246 having a curved cam surface 247 on its inner periphery. When the actuator 241 is withdrawn in the rearward direction, as shown in FIG. 7, to its neutral position due to the spring 240, the rollers 242 are in their contracted position and engages a step 251 formed at the forward end of the actuator 241. The fingers 228 are thus able to contract or fold radially inwardly as they pivot on the pins 229. Tensions springs 250 interconnect the forward ends of the fingers 228 and pull the fingers together. However when the actuator 241 is forceably moved toward the left due to air pressure, as seen in FIG. 6, the rollers 242 expand and roll radially outwardly as the cam surfaces 243 move toward the left. The expanding rollers also roll to the radially inner surface of the cam 247 on the members 246 and force the fingers 228 to expand to the position where they engage and hold the glass 25. The members 246 also have steps 252 at the ends of the cam surface 247 in order to limit the movement of the rollers 242. When the rollers 242 are in the expanded positions shown in FIG. 6, they engage substantially axially extending surfaces 250 on the cam members 243 and 246, so that the mandrel is able to withstand a relatively large radially directed force applied by the belt and pressure roller.

To actuate the mechanism to hold a glass, a tube 256 is connected between a coupling 257 and a source of pressurized air. A tube 258 connects the coupling 257 with the interior of the chamber 236. When the fingers 228 are to be expanded to hold a glass, pressure is applied in the tube 256 causing the piston 237 and the actuator 241 to move toward the left. As described above, this movement causes the fingers 228 to swing outwardly. After a decal has been applied to the glass 25, the pressure in the tube 256 is released and the contracting force exerted by the springs 250 and 240 push the actuator 241 and the piston 237 toward the right, allowing the fingers 228 to be contracted to the position shown in FIG. 7, at which time the glass may be removed. The fingers 228 may also be mechanically or manually contracted. As shown in FIG. 6, the outer surfaces of the fingers 228 and the nose-piece 232 are preferably shaped to the configuration of the inner surface of the glass 25.

Since the outer surface 219 of the glass 25 has a negative taper rather than a positive taper, the decal for the glass 25 must also be different from the decal shown in FIGS. 8 and 9. In the case of the decal for the negative tapered glass, it is arced in the opposite direction from the decal 21. In other words, the ends of the decal bow upwardly rather than downwardly as shown in FIG. 8. The pivot plate, the column, the arm 101 and the pressure roller also pivot differently. At the beginning of a decal applying cycle, the pivot plate is moved rearwardly to its maximum extent and is pivoted so that the glass angles toward the right. During the movement of the web, the mandrel and the pressure roller pivot toward the left position and they also experience the linear movement forwardly and then rearwardly.

The arm 171 and the pressure roller 63 are mounted in the forward position shown in FIG. 5 simply because there is insufficient space at the rear of the machine for the two bearing blocks 221 and 181. If the arm 171 were in the position shown in FIG. 3, the angles of the pressure roller and the mandrel would cause the two bearing blocks to interfere with one another, and to prevent this, the arm 101 is swung to the forward position. Otherwise, the remainder of the operation of the arrangement shown in FIG. 5 is similar to that shown in FIG. 3 during the transfer of a decal.

The resilient layers covering the mandrels and the pressure roller, and the belt may be made of a resilient, high friction material such as silicone rubber. The rubber used for the belt and on a solid mandrel (FIG. 3) is preferably harder than rubber used on the fingers of an expandable mandrel (FIG. 6) so that it can conform better to the curvature of the glass. Also, if the glass has a slight curvature of the wall to be decorated, it is preferred that a soft rubber be used. A machine as described herein may satisfactorily decorate an area up to about 340° of a glass having a taper up to approximately plus or minus 10°.

The machine disclosed herein has numerous advantages. It can be used to decorate either articles having a straight cylindrical outer wall or articles having a plus or minus taper of the outer wall. The machine is able to transfer relatively flimsy decorations such as decals with a minimum of distortion, and when decorating a tapered article, it does not require a decal having an initial distortion.

What is claimed is:

1. A machine for transfering a series of indicia from a relatively long web to a series of articles, each of said articles having a taper on its outer wall surface and the indicia being spaced on said web, comprising a support frame, a movable frame connected to said support frame for pivotal movement on an axis and linear movements relative to said axis and said support frame, a mandrel fastened to said movable frame for rotatably supporting an article, pressure means including a tapered pressure roller which is rotatably mounted on said movable frame, said mandrel and said pressure roller having adjacent sides which are substantially parallel, web transport means for holding the web between said mandrel and said pressure roller in a plane that is substantially parallel to said adjacent sides, power means for moving said pressure roller and said mandrel towards each other to press the web including an indicium tightly against said outer wall surface of an article on said mandrel, said web transport means including web drive means for moving the web past said mandrel and said pressure means, said mandrel and said pressure roller rotating with said web movement and moving pivotally and linearly in an arcuate movement relative to said web.

2. A machine as in claim 1, wherein said outer surface of an article and said tapered pressure roller are movable in an arc on a plane surface, and the radius of said arc of said pressure roller is substantially equal to the radius of said arc of said outer surface.

3. A machine as in claim 1 or 2, wherein said pressure means further includes a belt having a first run that is adjacent said outer surface and a second run that is displaced from said first run and said outer surface, said runs extending substantially parallel to said web and said web being adapted to tightly engage said first run, and said pressure roller extending between said runs and being engagable with said first run, said roller being engagable with one side of said first run and the web being engagable with the other side of said first run.

4. A machine as in claim 3, wherein said mandrel, said pressure roller and said belt are freely rotatable and are adapted to be rotated by frictional engagement with the moving web.

5. A machine as in claim 3, wherein said power means is connected to said pressure roller and to said belt and is operable to move said roller and said belt tightly against an article on said mandrel.

6. A machine as in claim 5, and further including guide means connecting said belt with said support frame, whereby said belt is movable against an article on said mandrel but is not movable with said movable frame.

7. A machine as in claim 1, wherein said movable frame is connected to said support frame by pivot means having an axis of pivotal movement, said axis being perpendicular to the plane of the web, and by linear movement means having a direction of movement that is perpendicular to the length of the web.

8. A machine as in claim 7, wherein said axis of pivotal movement extends substantially through the centers of said pressure roller, the web and an article on said mandrel.

9. A machine as in claim 2, wherein said pressure roller is rotatable on a roller axis and said mandrel is rotatable on a mandrel axis, said roller and mandrel axes being angled relative to the plane of the web, said angled axis being related to the angle of taper of the article and said pressure roller to place said adjacent sides in substantially parallel relation.

10. A machine as in claim 7, wherein said movable frame is removably connected to said support frame and is connectable to said support frame in two positions, said two positions being symmetrical about said axis of pivotal movement and being displaced by 180°.

* * * * *